United States Patent
Kato et al.

(10) Patent No.: US 10,756,936 B2
(45) Date of Patent: Aug. 25, 2020

(54) SIGNAL TRANSMITTING APPARATUS

(71) Applicant: MITSUBISHI ELECTRIC CORPORATION, Tokyo (JP)

(72) Inventors: Yasunori Kato, Tokyo (JP); Hideyuki Awazu, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/607,558

(22) PCT Filed: May 18, 2017

(86) PCT No.: PCT/JP2017/018672
§ 371 (c)(1),
(2) Date: Oct. 23, 2019

(87) PCT Pub. No.: WO2018/211660
PCT Pub. Date: Nov. 22, 2018

(65) Prior Publication Data
US 2020/0099555 A1    Mar. 26, 2020

(51) Int. Cl.
*H04K 1/10* (2006.01)
*H04L 27/28* (2006.01)
(Continued)

(52) U.S. Cl.
CPC ........... *H04L 27/18* (2013.01); *H04B 7/0413* (2013.01); *H04L 27/3488* (2013.01); *H04L 27/2602* (2013.01); *H04L 27/36* (2013.01)

(58) Field of Classification Search
CPC ..... H04L 27/18; H04L 27/04; H04L 27/3488; H04L 27/2602; H04L 27/36;
(Continued)

(56) References Cited

U.S. PATENT DOCUMENTS

| | | | |
|---|---|---|---|
| 2013/0195222 A1* | 8/2013 | Zatman | H04L 27/04 375/300 |
| 2015/0048977 A1* | 2/2015 | Khandani | H01Q 3/46 342/385 |

(Continued)

FOREIGN PATENT DOCUMENTS

| | | |
|---|---|---|
| JP | 6042045 B1 | 12/2016 |
| WO | WO 2015/175374 A1 | 11/2015 |

OTHER PUBLICATIONS

Office Action issued in corresponding GB Application No. 1915465.7 dated Dec. 12, 2019.

(Continued)

*Primary Examiner* — Phuong Phu
(74) *Attorney, Agent, or Firm* — Birch, Stewart, Kolasch & Birch, LLP (57) ABSTRACT

A weight switching unit outputs weights for modulation signals so that, on a constellation diagram in the complex plane, a position of a signal point in a communication direction corresponds to that of the modulation symbol, and the position of the signal point in a non-communication direction becomes different from that of the signal point in the communication direction. Weight applying units apply, to the modulation signals emitted from antennas, weights for each modulation symbol output from the weight switching unit.

6 Claims, 7 Drawing Sheets

(51) Int. Cl.
*H04L 27/18* (2006.01)
*H04L 27/34* (2006.01)
*H04B 7/0413* (2017.01)
*H04L 27/26* (2006.01)
*H04L 27/36* (2006.01)

(58) Field of Classification Search
CPC ........ H04B 7/0413; H04B 1/713; H04K 1/02; H01Q 3/46; H01Q 3/28
USPC ................ 375/260, 130, 295, 298, 302, 303
See application file for complete search history.

(56) References Cited

U.S. PATENT DOCUMENTS

| 2015/0200704 | A1* | 7/2015 | Graceffo | H04B 1/713 |
| | | | | 375/141 |
| 2017/0026146 | A1* | 1/2017 | Tollefson | H04K 1/02 |
| 2019/0051984 | A1 | 2/2019 | Kuriyama et al. | |
| 2020/0076075 | A1* | 3/2020 | Kuriyama | H01Q 3/28 |

OTHER PUBLICATIONS

Daly et al., "Directional Modulation and Coding in Arrays", 2011 IEEE International Symposium on Jul. 8, 2011, pp. 1984-1987.
Ding et al., "Directional modulation transmitter radiation pattern considerations", IET Microwaves, Antennas & Propagation, 2013, vol. 7, Issue 15, pp. 1201-1206.
International Search Report (PCT/ISA/210) issued in PCT/JP2017/018672 dated Aug. 1, 2017.
Japanese Office Action for application No. 2017-553039 dated Dec. 5, 2017.

* cited by examiner

SIGNAL TRANSMITTING APPARATUS

TECHNICAL FIELD

The present invention relates to a signal transmitting apparatus that maintains the confidentiality of wireless communication by limiting a communication direction.

BACKGROUND ART

Conventionally, there has been an apparatus that improves confidentiality in wireless communication by limiting a communication direction (see, for example, Patent Literature 1). This apparatus superimposes a disturbing beam on a communication beam so as to cover the communication beam with the disturbing beam except in the communication direction, thereby making the communication beam difficult to be observed by a communication interceptor.

CITATION LIST

Patent Literatures

Patent Literature 1: Japanese Patent No. 6042045

SUMMARY OF INVENTION

Technical Problem

However, in the technology described in Patent Literature 1 above, for example, in the case where a binary phase shift keying (BPSK) signal of two signal points on a constellation diagram in the complex plane is being transmitted in the wireless communication, even when the relationship between the phases or amplitudes is corrupted from BPSK, if it is found that two signal points exist at the intercept point, there is a possibility that an interceptor identifies that the transmission is performed in the BPSK, and the confidentiality would be found insufficient.

The present invention has been made to solve such a problem, and an object thereof is to obtain a signal transmitting apparatus capable of improving confidentiality.

Solution to Problem

A signal transmitting apparatus according to present invention includes: an array antenna constituted by a plurality of element antennas; a modulation signal generating unit for generating modulation signals emitted from the array antenna; a weight switching unit for selecting and outputting weights for the modulation signals so that, on a constellation diagram in a complex plane for the modulation signals emitted from the array antenna, a position of a signal point in a communication direction corresponds to a position of a modulation symbol generated by the modulation signal generating unit, and the signal point in a non-communication direction becomes the signal point corresponding to a different signal point among a plurality of the signal points that have equal amplitudes and phase angle differences with the adjacent signal points falling within a set range; and a weight applying unit for applying, to the modulation signals emitted from the array antenna, weights for each modulation symbol output from the weight switching unit.

Advantageous Effects of Invention

The signal transmitting apparatus according to the present invention selects the weights for the modulation signals so that, on the constellation diagram in the complex plane, a position of a signal point in a communication direction corresponds to a position of a modulation symbol generated by the modulation signal generating unit, and the signal point in a non-communication direction becomes the signal point corresponding to a different signal point among a plurality of the signal points that have equal amplitudes and phase angle differences with the adjacent signal points falling within a set range. Accordingly, the confidentiality in wireless communication can be improved.

DESCRIPTION OF EMBODIMENTS

Hereinafter, in order to explain the present invention in more detail, modes for carrying out the present invention will be described with reference to the accompanying drawings.

First Embodiment

Figure 1:
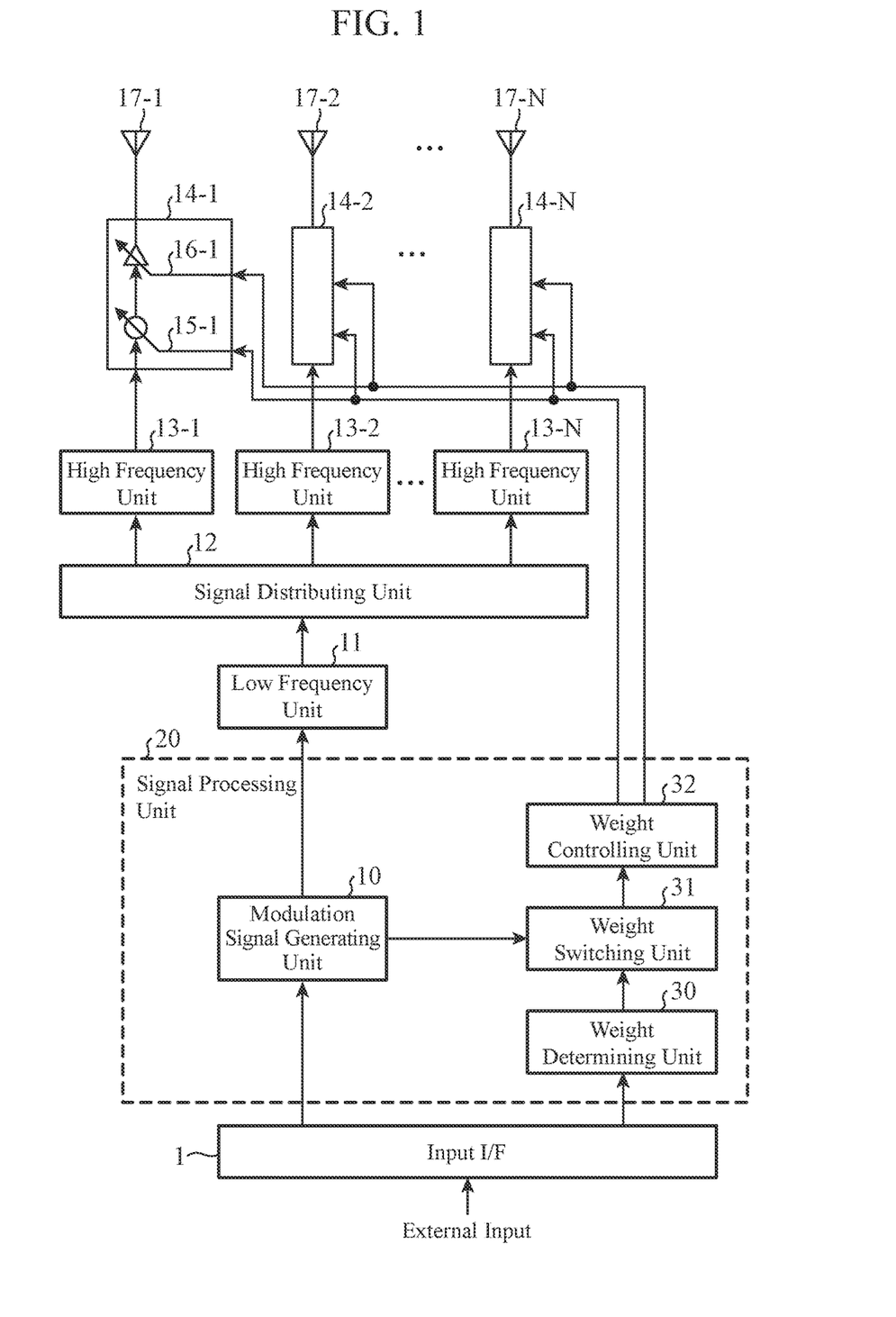
FIG. 1 is a configuration diagram of a signal transmitting apparatus according to a first embodiment of the present invention.

FIG. 1 is a configuration diagram of a signal transmitting apparatus according to the present embodiment.

As shown in the drawing, the signal transmitting apparatus according to the present embodiment includes an input interface (input I/F) 1, a modulation signal generating unit 10, a low frequency unit 11, a signal distributing unit 12, high frequency units 13-1 to 13-N, weight applying units 14-1 to 14-N, antennas 17-1 to 17-N, a weight determining unit 30, a weight switching unit 31, and a weight controlling unit 32.

The input interface 1 is an interface for a universal serial bus (USB), serial communication, a local area network (LAN) such as Ethernet (registered trademark) or the like, an interface including an IEEE 1553B port, driver and the like, or an interface for receiving other external data.

The modulation signal generating unit 10 is a processing unit that modulates a transmission bit string input via the input interface 1 and outputs these modulation signals to the low frequency unit 11. The modulation signal generating unit 10 is also configured to output signal points on the constellation diagram to the weight switching unit 31 for the modulation signals output to the low frequency unit 11.

The low frequency unit 11 is a processing unit that converts the modulation signals from the modulation signal generating unit 10 into intermediate frequency-modulated waves, and is generally constituted by a digital-to-analog (DA) converter, a filter, an amplifier and the like. Moreover, the low frequency unit 11 may include a frequency converter to be configured to subject the intermediate frequency-modulated waves after DA conversion or after quadrature modulation to further frequency conversion. Furthermore, the low frequency unit 11 may include two DA converters, quadrature modulators, and the like to perform quadrature modulation.

The signal distributing unit 12 is a processing unit that distributes N (N is an integer of 2 or more) intermediate frequency-modulated waves. The high frequency units 13-1 to 13-N each include a filter, an amplifier, a frequency converter and the like, perform frequency convention on the N intermediate frequency-modulated waves distributed by the signal distributing unit 12 into a carrier frequency band, and output the carrier waves. The weight applying units 14-1 to 14-N are processing units that apply weights output from the weight controlling unit 32, and include variable phase shifters 15-1 to 15-N and variable amplifiers 16-1 to 16-N, respectively. On the basis of gain set values and phase set values output from the weight controlling unit 32, these weight applying units 14-1 to 14-N change the phases with the variable phase shifters 15-1 to 15-N, change the gains with the variable amplifiers 16-1 to 16-N. and output the carrier waves after applying the weights. Note that the variable phase shifters 15-1 to 15-N and the variable amplifiers 16-1 to 16-N are arranged in this order for input signals in the illustrated example, but the variable phase shifters 15-1 to 15-N and the variable amplifiers 16-1 to 16-N may be arranged in a reversed order. Note that the variable amplifiers 16-1 to 16-N may be variable attenuators, but are described herein as variable amplifiers.

The antennas 17-1 to 17-N are antennas for emitting into space each carrier wave after the weights are applied by the weight applying units 14-1 to 14-N. The configuration from the output of the signal distributing unit 12 to the antennas 17-1 to 17-N is N-parallel.

The weight determining unit 30 is a processing unit that determines the weights (hereinafter, these are called weights for each signal point) from setting information input via the input interface 1 and information on the signal points on the constellation diagram of the modulation signals generated by the modulation signal generating unit 10 and outputs the weights. The weight switching unit 31 is a processing unit that selects corresponding weights from among the weights for each signal point determined by the weight determining unit 30 depending on the information on the signal points on the constellation diagram determined by the modulation signal generating unit 10 and outputs the corresponding weights as applying weights. The weight controlling unit 32 is a processing unit that converts the applying weights into the input formats of the weight applying units 14-1 to 14-N and outputs the converted weights. Herein, when the variable phase shifters 15-1 to 15-N and the variable amplifiers 16-1 to 16-N of the weight applying units 14-1 to 14-N are digitally controlled, parallel/serial conversion of control values is performed or the control values are converted into set values to be output. In a case of analog control, the control values are converted into voltages or the like corresponding to the control values to be output.

The signal processing unit 20 is constituted by the modulation signal generating unit 10, the weight determining unit 30, the weight switching unit 31, and the weight controlling unit 32. The signal processing unit 20 is a device capable of performing signal processing in a field-programmable gate array (FPGA), a digital signal processor (DSP), and a processor (CPU or the like) of a computer. If the modulation signal generating unit 10 has a low symbol rate, a microcomputer may be used. Moreover, a device for each and every processing unit may be used, or a plurality of devices may be used for parallel arithmetic and the like.

Figure 2:
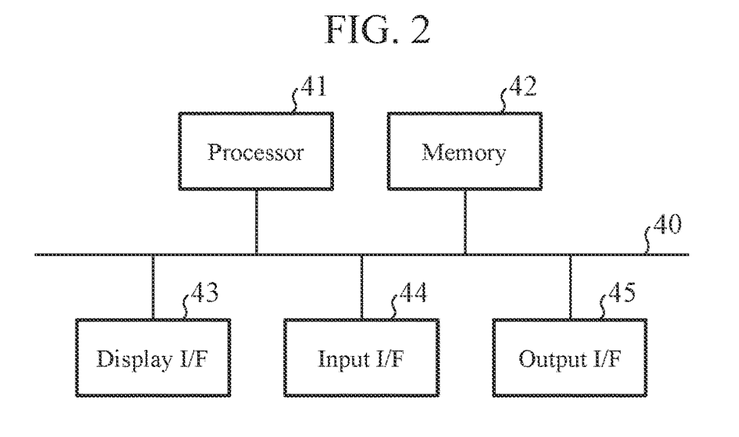
FIG. 2 is a hardware configuration diagram of a signal processing unit of the signal transmitting apparatus according to the first embodiment of the present invention.

FIG. 2 is a block diagram showing a computer when the signal processing unit 20 is implemented by using a processor.

The illustrated computer is constituted by a processor 41, a memory 42, a display I/F 43, an input I/F 44 and an output I/F 45, which are connected to a bus 40, and outputs an arithmetic operation result from the output I/F 45. Herein, each processing unit of the signal processing unit 20 is implemented by executing, with the processor 41, programs which correspond to each processing unit and stored in the memory 42. Moreover, the display I/F 43 is an interface to an external display apparatus, and the input I/F 44 is an interface corresponding to the input interface 1. Furthermore, the output I/F 45 is an interface to the low frequency unit 11 and the weight applying units 14-1 to 14-N. Further, the bus 40 is a communication path for communicably connecting the processor 41, the memory 42, the display I/F 43, the input I/F 44 and the output I/F 45 to each other.

Next, the operation of the signal transmitting apparatus according to the first embodiment will be described.

In the modulation performed by the modulation signal generating unit 10, any modulation scheme, such as BPSK, quadrature phase shift keying (QPSK), 16-ary quadrature modulation (16QAM), frequency shift keying (FSK) or amplitude shift keying (ASK), can be applied to the transmission bit string. In addition, spectrum spreading may be performed as secondary modulation. The details of each modulation scheme are omitted herein, and the case of transmission by QPSK will be described.

Figure 3:
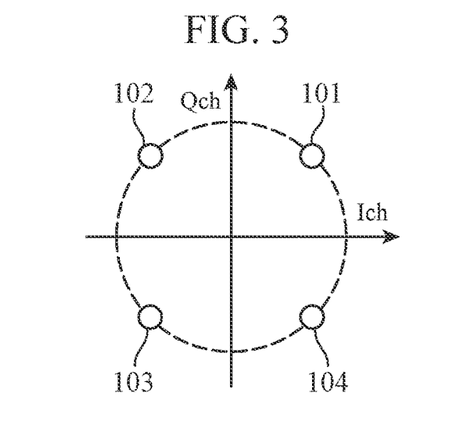
FIG. 3 is an explanatory view for a constellation diagram of the signal transmitting apparatus according to the first embodiment of the present invention.

Suppose that the modulation signals output from the modulation signal generating unit 10 are arranged at the positions of signal points 1 to 4 corresponding to modulation symbols in the constellation diagram in FIG. 3. Note that, in FIG. 3, a signal point 101 indicates the signal point 1, a signal point 102 indicates the signal point 2, a signal point 103 indicates the signal point 3, and a signal point 104 indicates the signal point 4.

The modulation signals are converted into the intermediate frequency-modulated waves in the low frequency unit 11, and the N intermediate frequency-modulated waves are distributed by the signal distributing unit 12. The N intermediate frequency-modulated waves distributed by the signal distributing unit 12 are further converted into carrier frequencies by the high frequency units 13-1 to 13-N. The corresponding weights are applied to the signals of the carrier frequencies of these high frequency units 13-1 to 13-N by the weight applying units 14-1 to 14-N, and the weighted signals are emitted into the air from the antennas 17-1 to 17-N.

When an antenna n ($1 \leq n \leq N$) is positioned at polar coordinates ($d_n$, $\theta_n$), radio waves emitted from each antenna can be regarded as plane waves at a sufficiently long distance, and a composite wave thereof can be expressed by equation (1). Generally, a propagation time difference $\tau_n$ cannot be ignored for the cycles of the carrier waves, but can be safely ignored for the modulation cycles of a signal s(t). An equivalent low-band system with carrier components removed for simplification is expressed. Further, suppose that the antenna n is positioned at polar coordinates ($d_n$, 0) for simplification. Then, a composite wave y(t) of the equivalent low-band system is expressed by equation (2).

Figure 4:
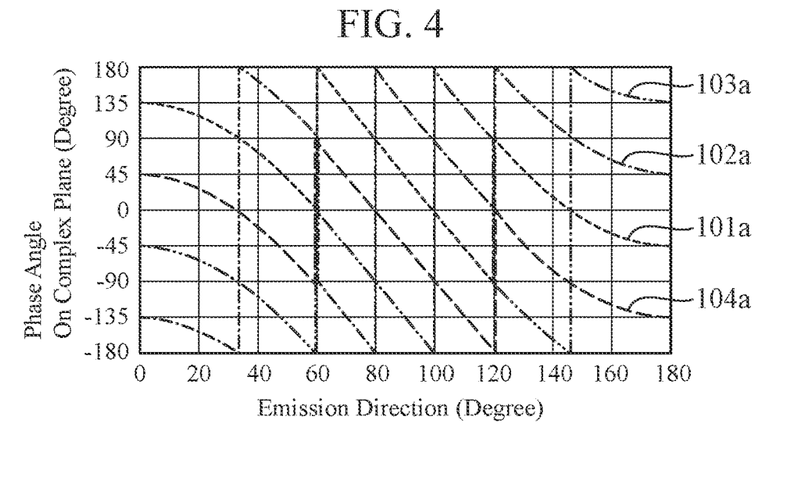
FIG. 4 is an explanatory diagram showing phase angles on a complex plane when confidentialization is not performed in the signal transmitting apparatus according to the first embodiment of the present invention.

Herein, first, a case where the confidentialization is not performed is shown. The phase angle of the composite wave x(t) on the complex plane is shown in FIG. 4 for the case where $w_n$(t) in equation (2) is 1.0 regardless of the antennas. In FIG. 4, since the relative phase differences among the signal points 1 to 4 are 90 degrees regardless of the emission directions, there is a possibility that QPSK is identified by interception from any direction. Note that, in FIG. 4, a dotted line 101a is the phase angle of the signal point 1, an alternate long and short dash line 102a is the phase angle of the signal point 2, an alternate long and two short dashed line 103a is the phase angle of the signal point 3, and a broken line 104a is the phase angle of the signal point 4.

$$v(t) = \sum_{n=1}^{N} s(t - \tau_n) w_n(t) \exp(j\omega_c t) \exp(-j\omega_c \tau_n) \quad (1)$$
$$= \sum_{n=1}^{N} s(t - \tau_n) w_n(t) \exp(j\omega_c t) \exp\left(j2\pi \frac{d_n \cos(\phi - \theta_n)}{\lambda_c}\right)$$

t: Time
$\tau_n$: Propagation time difference due to path difference with respect to origin occurred at antenna n
s(t): Complex baseband signal at time t
$w_n$(t): Complex weight applied at time t
$\omega_c$: Angular frequency of carrier wave
$\lambda_c$: Carrier wavelength
$\varphi$: Emission direction
j: Imaginary unit
v(t): Composite wave at time t $$y(t) = \sum_{n=1}^{N} s(t) w_n(t) \exp\left(j2\pi \frac{d_n}{\lambda_c} \cos\phi\right) \quad (2)$$

By the way, in the present embodiment, the weight is determined by the weight determining unit 30 so that the relative phase difference does not become 90 degrees. Specific processes are shown in the flowcharts of FIGS. 5 and 6.

Figure 5:
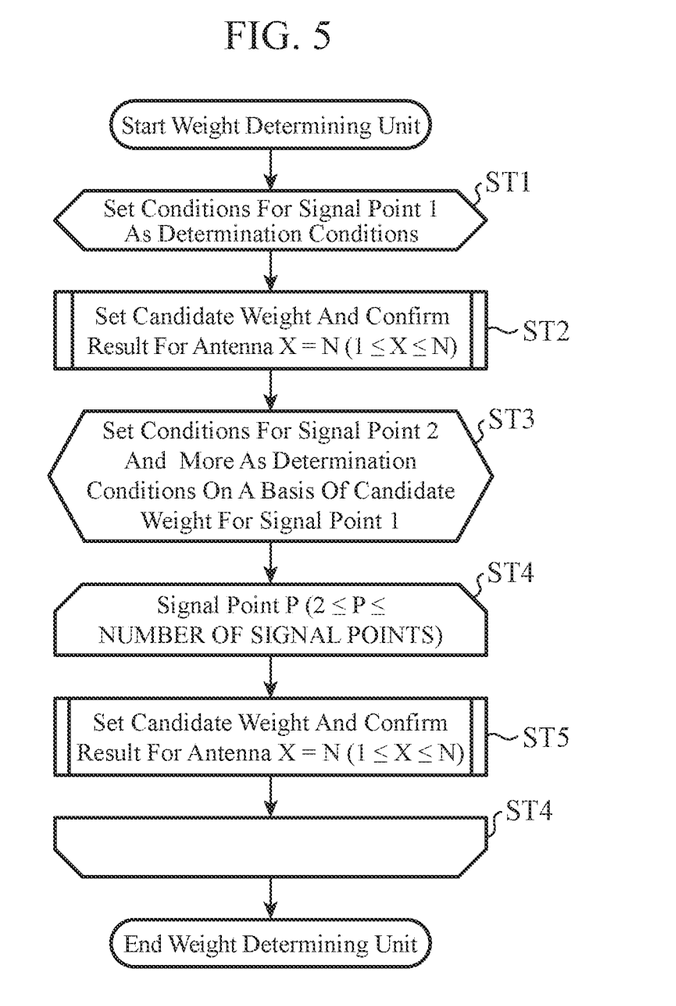
FIG. 5 is a flowchart showing the operation of the signal transmitting apparatus according to the first embodiment of the present invention.
Figure 6:
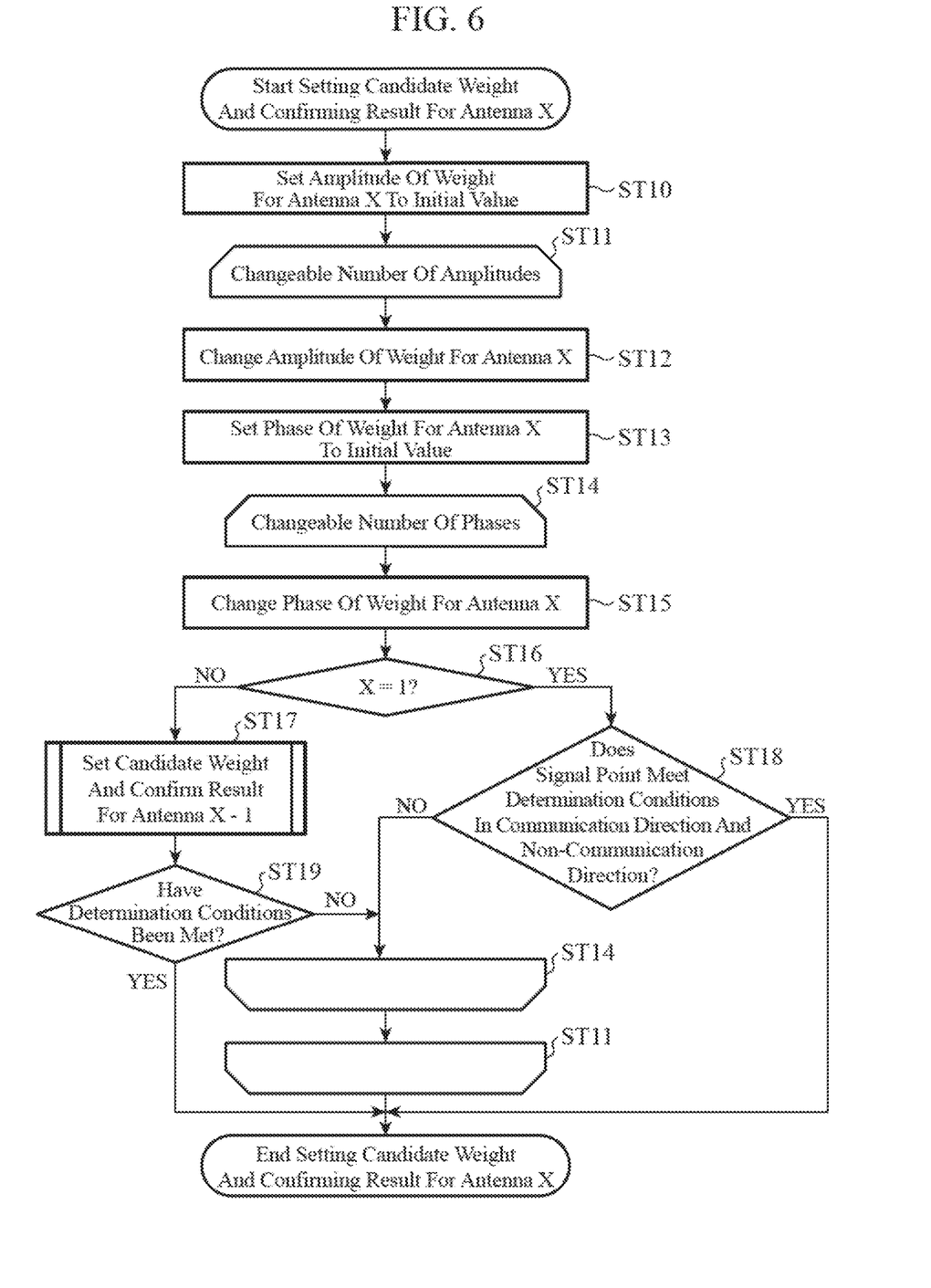
FIG. 6 is a flowchart showing the details of the processing in FIG. 5 in the signal transmitting apparatus according to the first embodiment of the present invention.

Since the processing shown in the flowcharts of FIGS. 5 and 6 determine the weights for each signal point on the constellation diagram in the complex plane, the processing determine the weight meeting the determination conditions from among all combinations of phases and amplitudes that can be taken by all antennas for each signal point. As the main processing, the processing in FIG. 5 changes the signal points on the constellation diagram in the complex plane, and the processing in FIG. 6 sequentially changes the antenna, the amplitude and phase of the weight for the signal point set in the processing in FIG. 5 and further determine whether the determination conditions are met. Each step in FIG. 5 and FIG. 6 will be described hereinafter.

First, the weight determining unit 30 sets thresholds of the determination conditions for the signal point 1 as the determination conditions from the information on the number of signal points and the positions of the signal points among the setting information given from the input interface 1 as an external input (Step ST1). Note that the thresholds of the determination conditions will be described in Step ST18. The processing of Step ST2 in FIG. 5 is the processing shown in FIG. 6, and the flow shown in FIG. 6 is executed recursively. That is, in Step ST2, the flow in FIG. 6 is executed to set a candidate weight and confirm the result for an antenna X=N.

To set the candidate weight and confirm the result for the antenna X, the weight determining unit 30 first sets the amplitude of the weight for the antenna X to an initial value (Step ST10 in FIG. 6). Herein, the description will be given in which the weight applying units 14-1 to 14-N are digitally controlled (a control value range of 001 to 111) with, for example, 000 as an initial value.

Step ST11 is a loop for sequentially changing an amplitude control value of the antenna X. First, in Step ST12, the amplitude control value is changed. Although the change amount may not be 1 and may be an increase or a decrease, all control values are covered by the number of times of looping in Step ST11. Herein, suppose that 000 is increased to 001. In Steps ST13 to ST15, processing similar to that in Steps ST10 to ST12 for the amplitude are performed for the phase to obtain the candidate weight for the antenna X.

Next, the weight determining unit 30 determines whether a target antenna for which the candidate weight is set is X=1 (Step ST16). In the case of the execution from Step ST2, X=N≠1 (Step ST16: NO) so that the processing proceeds to Step ST17 to recursively execute the flow in FIG. 6 in order to set the candidate weight of the amplitude and the phase for the antenna X-1. Next, it is determined whether the determination conditions are met (Step ST19). If the determination conditions are not met (Step ST19: NO), the processing from Step ST12 is executed recursively. If the determination conditions are met in Step ST19 (Step ST19: YES), the search for the weights ends.

When the flow in FIG. 6 is executed recursively, Step ST16 is determined as YES in the case of the antenna X=1, and the processing proceeds to Step ST18.

In Step ST18, it is determined whether the candidate weights set for the antennas 17-1 to 17-N (set for 1 to N of the antenna X in FIG. 6) meet the conditions. It is determined whether a composite wave $y_1(\varphi)$ of the signal point 1 meets equations (4) and (5) from equation (3) expressing equation (2) for a signal point in as the determination for the conditions set in Step ST1 by using a power lower limit $Th_{d, low}$ in a communication direction, a power upper limit $Th_{d, high}$ in the communication direction, a power lower limit $Th_{u, low}$ in a non-communication direction, a power upper limit $Th_{u, high}$ in the non-communication direction, the communication direction $\varphi_d$ and the non-communication direction $\varphi_u$, which are input from the input interface 1.

If the conditions are not met, Step ST18 is No, and the loop of Step ST14 or Step ST11 is sequentially executed. With regard to the flow in FIG. 6, the amplitude and the phase are set for the antenna X=N when the execution is performed from Step ST2 in FIG. 5, and the amplitude and the phase are set for the antenna X=N−1 when the execution is next performed recursively. At last, the amplitude and the phase are set for the antenna X=1, and the determination in Step ST18 is performed. If the conditions are not met in the determination in Step ST18, the determination in Step ST18 is sequentially performed under the conditions that the amplitude and the phase of the antenna X=1 are changed.

Further, the determination as to whether the conditions are met is performed for all the combinations until the conditions are met in such a manner that, if the conditions are not met in the determination, the determination in Step ST18 is sequentially performed under the conditions that the amplitude and the phase of the antenna X=1 are changed in the case where the phase of the antenna. X=2 is changed, and if the conditions are not still met, the phase of the antenna X=2 is further changed.

Step ST18 is YES when the conditions are met in the determination, the flow in FIG. 6 executed from Step ST2 in FIG. 5 ends, and that weight is set as a weight $w_{m=1,n}$ for the signal point 1.

Note that, in the search for weights in the flow in FIG. 6, the distribution characteristics (excitation distribution) of the Chebyshev distribution, the Taylor distribution or the like may be taken into account for the amplitudes and phases between the antennas. In addition, although equations (4) and (5) are the determination conditions for searching for a weight with a value within a certain range, the weight closest to a specific signal point may be searched from all the combinations of the weights.

In Step ST3 executed after Step ST2 in FIG. 5, the conditions for the determination as to determine a weight $w_{m \geq 2, n}$ for each signal point of the signal points 2 to 4 are set in the case of QPSK. In Step ST4, the processing of Step ST5 for the signal point 2 and the subsequent points is executed, and the flow in FIG. 6 is executed as in Step ST2.

The difference between the case of the execution from Step ST5 and the case of the execution from Step ST2 in the flow of FIG. 6 is only that the determination conditions are changed in Step ST3, and the determination conditions are equations (6) to (9) using the weight for the signal point 1 determined in Step ST2. Equations (6) and (7) are calculations for error vector magnitude (EVM) to obtain the distance between the two signal points on the constellation diagram.

The phase rotation angle from the Ich axis is not constrained in Step ST2 for the signal point of $y_1(\varphi_d)$. Therefore, $\exp(\delta_m)$ of $\text{Re}[y_1(\varphi_d)\exp(\delta_m)]$ or $\text{Im}[y_1(\varphi_d)\exp(\delta_m)]$ in equation (6) gives the relative phase difference of the signal point m with respect to the signal point 1 to $y_1(\varphi_d)$ of the signal point 1. When the clockwise direction is regarded as a positive angle, then $\delta_2 = -90$ degrees. $\delta_3 = -180$ degrees, and $\delta_4 = -270$ degrees in the alignment of the signal points in FIG. 3. Equation (7) does not include $\exp(\delta_m)$ because a signal point that is the same as or close to $y_1(\varphi_d)$ is used regardless of the signal points 1 to 4.

Herein, the case of QPSK has been shown, but, in the case of a modulation scheme including amplitude modulation such as QAM, the amplitude component should also be taken into consideration in equation (6).

Figure 7:
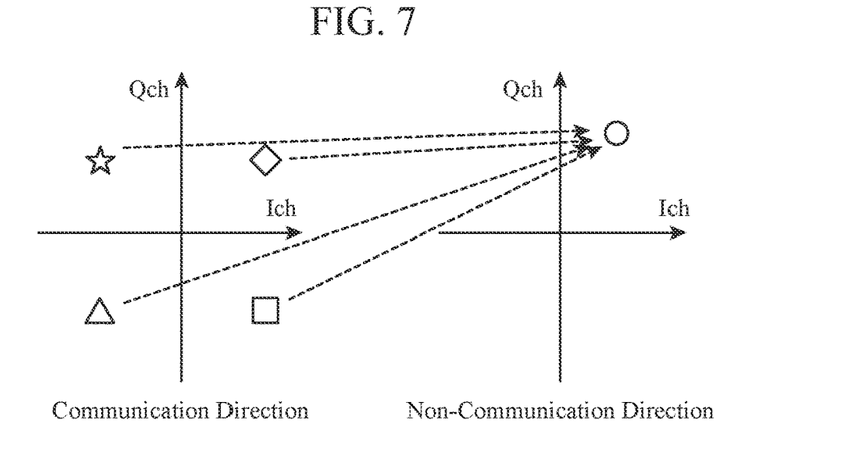
FIG. 7 is an explanatory view showing signal points in a communication direction and a non-communication direction of the signal transmitting apparatus according to the first embodiment of the present invention.

In this way, in positions of the signal points on the constellation diagram, the communication direction gives an arrangement where the phase is rotated by $\delta_m$ or near $\delta_m$, and the non-communication direction gives the same or near signal point. The directions are schematically shown in FIG. 7. However, FIG. 7 omits that each signal point rotates about the origin. In the communication direction in FIG. 7, a square indicates the signal point 1, a diamond indicates the signal point 2, a star indicates the signal point 3, and a triangle indicates the signal point 4. Moreover, a circle in the non-communication direction is a signal point.

Note that, after the phase rotation for the signal point 1 is determined in Step ST2, phase rotation may be given to the weight so that the arrangement becomes the same as the communication direction in FIG. 7.

Figure 8:
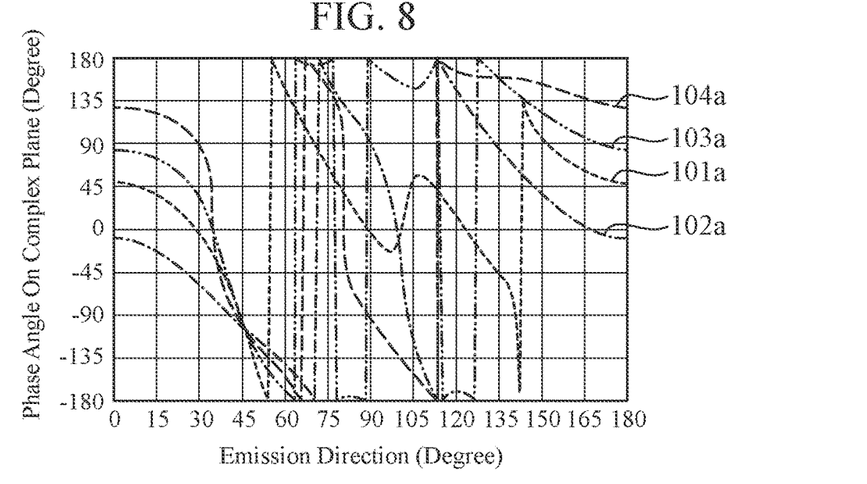
FIG. 8 is an explanatory diagram showing phase angles on the complex plane when confidentialization has been performed in the signal transmitting apparatus according to the first embodiment of the present invention.

As one example, FIG. 8 shows the phase angle of the composite wave $y_m(\varphi)$ in the constellation diagram obtained by equation (3) by applying the weight $w_{m,n}$ for each signal point obtained as described above. In FIG. 8, the communication direction is 90 degrees, and the non-communication direction is 45 degrees. The relative phase angle is 90 degrees in the 90 degree direction, and the non-communication direction is the same phase regardless of the signal points in the communication direction.

$$y_m(\phi) = \sum_{n=1}^{N} s_m w_{m,n} \exp\left(j 2\pi \frac{d_n}{\lambda_c} \cos\phi\right) \quad (3)$$

$s_m$: Complex signal point of signal point m
$y_m$: Composite wave at signal point m $$\text{Th}_{d,m=1,low} \leq P(y_1(\varphi_d)) \leq \text{Th}_{d,m=1,high} \quad (4)$$

$\varphi_d$: Communication direction
$P(a)$: Power of complex signal a
$\text{Th}_{d,m,low}$: Power lower limit threshold of signal point m in communication direction
$\text{Th}_{d,m,high}$: Power upper limit threshold of signal point m in communication direction $$\text{Th}_{u,m=1,low} \leq y_1(\varphi_u) \leq \text{Th}_{u,m=1,high} \quad (5)$$

$\varphi_u$: Non-communication direction
$\text{Th}_{u,m,low}$: Power lower limit threshold of signal point m in non-communication direction
$\text{Th}_{u,m,high}$: Power upper limit threshold of signal point m in non-communication direction $$EVM_m(\phi_d) = \sqrt{\begin{aligned}&(\text{Re}[y_m(\phi_d)] - \text{Re}[y_1(\phi_d)\exp(\delta_m)])^2 + \\ &(\text{Im}[y_m(\phi_d)] - \text{Im}[y_1(\phi_d)\exp(\delta_m)])^2\end{aligned}} \quad (6)$$

$\delta_m$: Phase rotation amount ($m \neq 1$) of signal point m with respect to signal point 1

$$EVM_m(\phi_u) = \sqrt{\begin{aligned}&(\text{Re}[y_m(\phi_u)] - \text{Re}[y_1(\phi_u)])^2 + \\ &(\text{Im}[y_m(\phi_u)] - \text{Im}[y_1(\phi_u)])^2\end{aligned}} \quad (7)$$

$$Th_{d,m \neq 1,low} \leq EVM_m(\phi_d) \leq Th_{d,m \neq 1,high} \quad (8)$$

$$Th_{u,m \neq 1,low} \leq EVM_m(\phi_u) \leq Th_{u,m \neq 1,high} \quad (9)$$

The weight $w_{m,n}$ for each signal point determined in this way by the weight determining unit 30 is output to the weight switching unit 31.

The weight switching unit 31 selects a weight $w_{m,n}$ for each signal point corresponding to a signal point output from the modulation signal generating unit 10 each time and outputs the weight $w_{m,n}$ to the weight controlling unit 32 as an applying weight.

The weight controlling unit 32 outputs the applying weights in accordance with the format of the weight applying units 14-1 to 14-N, the weight applying units 14-1 to 14-N apply the weights for the signal points, and the antennas 17-1 to 17-N performs the emission. The composite waves emitted from the antennas 17-1 to 17-N have the carrier components shown in equation (1) on the composite waves in equation (3).

Thus, when a desired relative phase difference for each signal point is given in the communication direction (also with a relative amplitude difference when amplitude modulation is performed) for transmission, a communication partner can perform the communication as with a general modulated wave. Meanwhile, in the non-communication direction, the weights are applied so that the signal points on the constellation diagram become the same or similar constellations regardless of the signal points 1 to 4. Thus, the carrier components are applied in a state where there are little or no so-called modulation components, and an interceptor will observe the sine wave (clean carrier) or slight modulations components of the carrier wave. Therefore, the confidentiality of the communication can be enhanced. Note that the weights are set so as to become the same or similar arrangements in the non-communication direction, but similar effects can be obtained as long as the weights with which the position of the signal point is within the range of the set values including the error, are used.

Although the case of the digitally controlled weight applying units 14-1 to 14-N has been described in the above example, similar effects can be obtained also in the case of analog control as long as the weights are controlled by sufficiently small control amounts.

Both the amplitude and the phase are changed in the search for applying weights in FIG. 6, but either of two may be changed.

Although the applying weights are determined by the weight determining unit 30 in the signal processing unit 20 in FIG. 1, the applying weights may be determined in advance depending on the communication direction or the non-communication direction. In this case, the weight switching unit 31 or the weight determining unit 30 holds the determined weights, the information on the communication direction and the non-communication direction is acquired as the setting information via the input interface 1, and the weight switching unit 31 selects the applying weight from among the held weights. In the case of fixed wireless communication in which it is unnecessary to change the communication direction or the non-communication direction, it is also unnecessary to select the weight from among the held weights.

If the determination conditions are met in Step ST19, the weight search is ended by selecting YES. However, without ending, the weight may be searched in a whole set of weights so that the signal point has the minimum values of equations (6) and (7) and becomes closest to the ideal point in equations (3) and (4).

In the above example, the determination for the conditions is performed by sequentially changing the weight in FIG. 6, but algorithm such as genetic algorithm (GA) may be used to search for the weight for each signal point.

Although FIG. 1 shows the analog beam forming configuration in which the antenna and the weight applying unit are paired, the configuration may be digital beam forming or sub-array configuration, and the arrangement may be of configuration of any array antenna, such as a linear array antenna, a circular array antenna, a conformal array antenna or a planar array antenna.

There may be a plurality of non-communication directions and communication directions, and there also may be a spread. When there is a spread, the determination as to whether the determination conditions are met, and the like should be performed for one or more representative directions in divided areas obtained by dividing the spread area into a plurality of areas, for both ends of the spread area, or the like. Moreover, the thresholds of equations (3), (4), (8) and (9) may be changed for each direction.

Furthermore, in the case of a multicarrier modulation scheme using Fourier transform such as orthogonal frequency division multiplexing (OFDM) as a modulation scheme, effects similar to those of the present embodiment can be obtained when the weights are applied before inverse Fourier transform, and full digital beam forming is performed.

As described above, the signal transmitting apparatus according to the first embodiment includes: an array antenna constituted by a plurality of element antennas: a modulation signal generating unit for generating modulation signals emitted from the array antenna; a weight switching unit for outputting weights for the modulation signals so that, on a constellation diagram in a complex plane for the modulation signals emitted from the array antenna, a position of a signal point in a communication direction corresponds to the position of modulation symbol generated by the modulation signal generating unit, and the position of the signal point in a non-communication direction becomes different from that of the signal point in the communication direction: and a weight applying unit for applying, to the modulation signals emitted from the array antenna, weights for each modulation symbol output from the weight switching unit. Therefore, the confidentiality in wireless communication can be improved.

Further, according to the signal transmitting apparatus of the first embodiment, the weight switching unit sets, as the weights in the non-communication direction, the weights that make the signal points in the constellation diagram be positioned in the range of the set values. Thus, the interceptor will observe the sine wave or slight modulation components of the carrier wave, and the confidentiality in the wireless communication can be further enhanced.

Second Embodiment

A second embodiment is an example in which a modulation scheme different from the modulation scheme in the communication direction is observed in the non-communication direction.

Herein, since the configuration of a signal transmitting apparatus on a drawing is the same as that of the first embodiment shown in FIG. 1, the second embodiment will be described by using the configuration in FIG. 1.

Figure 9:
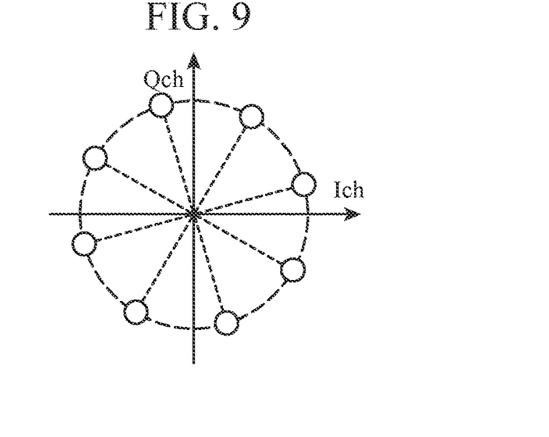
FIG. 9 is an explanatory view showing the constellation diagram of a composite wave in the non-communication direction in a signal transmitting apparatus according to a second embodiment of the present invention.

A weight determining unit 30 of the second embodiment determines weights for signal points so that the signal points on the constellation diagram in the non-communication direction have equal amplitudes and equal intervals for phase angles with adjacent signal points. FIG. 9 is a constellation diagram of the composite wave in the non-communication direction with respect to the weights determined by the weight determining unit 30 in this case. In the first embodiment shown in FIG. 7, the signal points on the constellation diagram of the composite wave in the non-communication direction are arranged at one point or in the vicinity of one point regardless of the signal points in the communication direction. However, in the second embodiment shown in FIG. 9, 360 degrees are equally divided into eight in the constellation diagram.

The weight determining unit 30 determines a weight for each of the signal points in the communication direction so that the signal points become the eight points in FIG. 9 in the non-communication direction. That is, in the case of QPSK, 32 weights are obtained as a total of 4 points x 8 points in the communication direction. In any case, the signal points are arranged at positions that have equal power or fall within the difference in power of the range set by the thresholds of the determination conditions.

A weight switching unit 31 randomly selects a weight from among eight types of weights depending on the signal point of the modulation signal generating unit 10. Accordingly the weight switching unit 31 sequentially selects and outputs, as the weights in the non-communication direction, the weights whose signal point on the constellation diagram corresponds to the different signal points among a plurality of signal points that have equal amplitudes and phase angle differences with adjacent signal points falling within the set range. Other configuration and operation are the same as those of the first embodiment so that the description thereof will be omitted herein.

In this way, the non-communication direction becomes 8 phase shift keying (PSK), and it is possible to make an interceptor observe a different modulation scheme on the carrier frequency the same as that in the communication direction.

Note that 360 degrees are equally divided into eight in FIG. 9, but may be equally divided into N (N is an integer of 2 or more). Moreover, as in the first embodiment, the signal points in the non-communication direction in FIG. 9 may be set to be within the set value range by the thresholds.

As described above, according to the signal transmitting apparatus of the second embodiment, the weight switching unit sequentially selects and outputs, as the weights in the non-communication direction, the weights whose signal point on the constellation diagram corresponds to the different signal points among a plurality of signal points that have equal amplitudes and phase angle differences with adjacent signal points falling within the set range. Thus, a modulation scheme different from that in the communication is observed in the non-communication direction, and the confidentiality in wireless communication can be improved.

Third Embodiment

A third embodiment is an example in which a modulation scheme different from the modulation scheme in the communication direction is observed in the non-communication direction, and an example in which weights for adjacent signal points are sequentially selected on the constellation diagram.

Herein, since the configuration of a signal transmitting apparatus on a drawing is the same as that of the first embodiment shown in FIG. 1, the description is given by using the configuration in FIG. 1.

Figure 10:
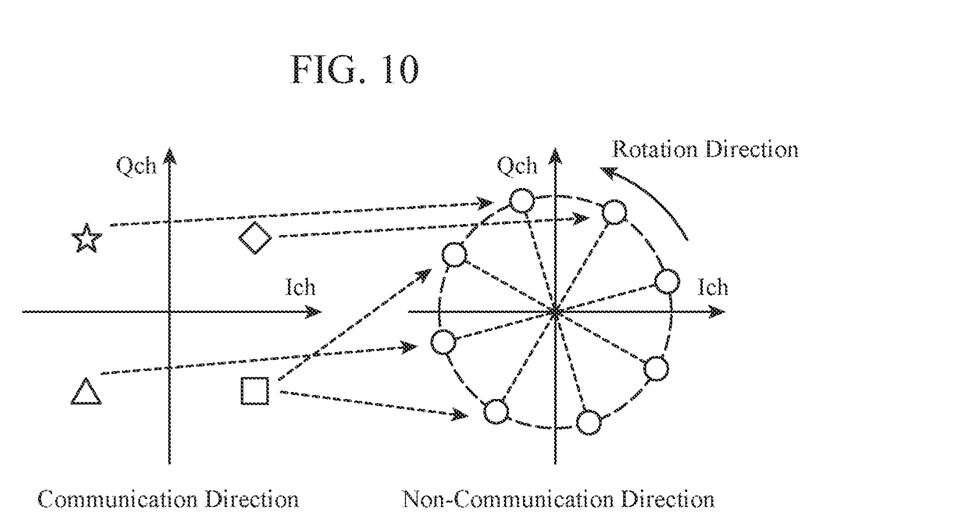
FIG. 10 is an explanatory view showing constellation diagrams in the communication direction and the non-communication direction in a signal transmitting apparatus according to a third embodiment of the present invention.

A weight determining unit 30 of the third embodiment obtains weights for signal points so that the signal points on the constellation diagram in the non-communication direction have equal amplitudes and equal intervals for phase angles with adjacent signal points. FIG. 10 is an explanatory view showing a constellation diagram of composite waves in the communication direction and the non-communication direction. The signal points in the non-communication direction shown in FIG. 10 are obtained by equally dividing 360 degrees into eight in the constellation diagram as in the signal points in FIG. 9, and a total of 32 kinds of weights are also obtained for signal points in the communication direction. Therefore, in any case, the signal points are at positions that have equal power or fall within the difference in power of the range set by the thresholds of the determination conditions. Note that this example shows a case where the transmission is performed in the order of a signal point 3 (a star), a signal point 1 (a square), a signal point 4 (a triangle) and a signal point 2 (a diamond) in the communication direction.

The difference from the second embodiment is that, as shown in FIG. 10, in a weight switching unit 31, weights are sequentially selected so that the signal points in the non-communication direction are rotated in a certain direction (may be clockwise or counterclockwise, and counterclockwise in FIG. 10). That is, the weight switching unit 31 selects and outputs the weights corresponding, to the different signal points among a plurality of signal points that have equal amplitudes and phase angle differences with adjacent signal points falling, within the set range. Other operation is the same as that in the second embodiment.

In this way, the composite wave in the non-communication direction becomes a sine wave, and it is possible to make an interceptor observe the sine wave (clean carrier) with a frequency different from the carrier frequency by a frequency according to the rotation speed of the signal points on the constellation diagram.

Note that 360 degrees are equally divided into eight in FIG. 10, but may be equally divided into N as long as the phase differences from the adjacent points in the rotation direction have constant values. In addition, even when the angle is indivisible for 360 degrees (e.g., 71 degrees or the like), it is only necessary that the phase differences from the adjacent points in the rotational direction have constant values.

As described above, according to the signal transmitting apparatus of the third embodiment, the weight switching unit selects the weights corresponding to the different signal points among a plurality of signal points that have equal amplitudes and phase angle differences with adjacent signal points filling within the set range. Thus, the modulation scheme different from that in the communication direction is observed in the non-communication direction, and the confidentiality in wireless communication can be improved.

Fourth Embodiment

A fourth embodiment is an example in which weights are selected at a time interval that is a multiple of a symbol generating interval of a modulation signal generating unit in the configuration of the third embodiment. Also, in the fourth embodiment, since the configuration of a signal transmitting apparatus on a drawing is the same as that of the first embodiment shown in FIG. 1, the fourth embodiment will be described by using the configuration in FIG. 1.

Figure 11:
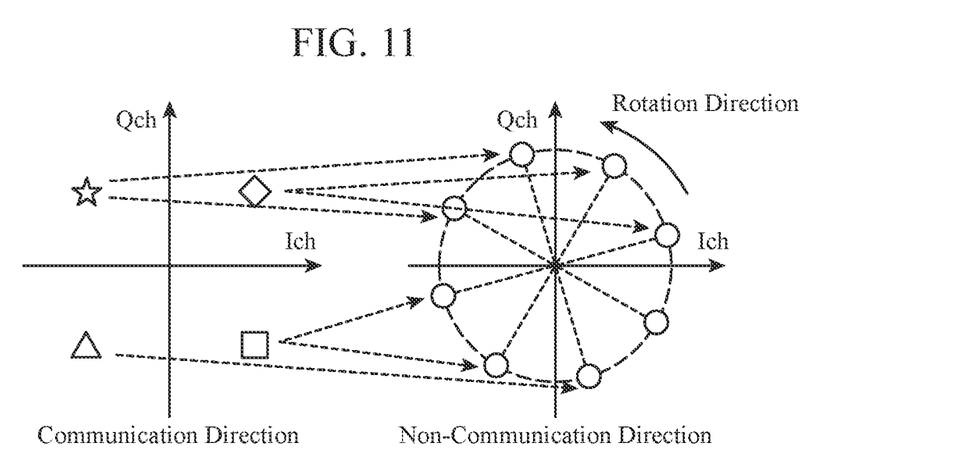
FIG. 11 is an explanatory view showing constellation diagrams in the communication direction and the non-communication direction in a signal transmitting apparatus according to a fourth embodiment of the present invention.

FIG. 11 is an explanatory diagram of signal points in the communication direction and the non-communication direction and selection processing thereof. As shown in the drawing, the phase differences with the adjacent points have a constant value in the non-communication direction as in the third embodiment, and every signal point is a signal point at a position that has equal power or falls within the difference in power of the range set by the thresholds of the determination conditions.

However, in the fourth embodiment, a weight switching unit 31 performs switching at a time interval that is R (R is an integer of 2 or more) times a change time interval of the signal points in the communication direction so that the signal points in the non-communication direction become R points (R=two points in FIG. 11) during the transmission of one signal point in the communication direction. Other configuration and operation are the same as those of the third embodiment.

As described above, according to the signal transmitting apparatus of the fourth embodiment, the weight switching unit selects the weights at a time interval that is a multiple of the modulation symbol generating interval of the modulation signal generating unit. Thus, it is possible to make an interceptor to observe a sine wave of a frequency different from that in the communication direction depending on the time interval and improve the confidentiality in wireless communication.

Fifth Embodiment

A fifth embodiment is an example in which a plurality of weights for differences between the communication direction and the direction other than the communication direction are held in advance, and a corresponding weight is selected as well as a steering vector is applied.

Figure 12:
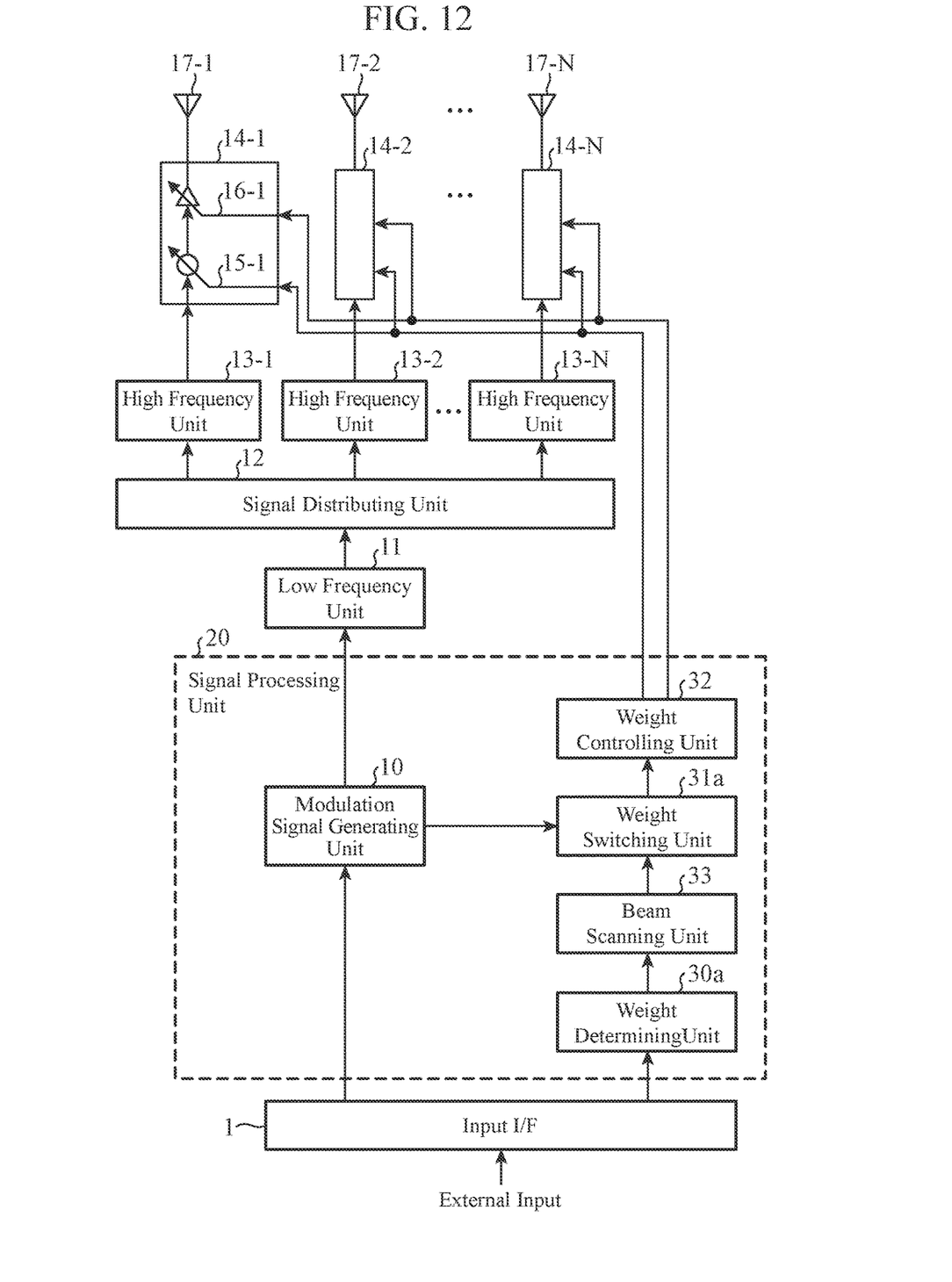
FIG. 12 is a configuration diagram of a signal transmitting apparatus according to a fifth embodiment of the present invention.

FIG. 12 is a configuration diagram of a signal transmitting apparatus according to the fifth embodiment.

The configuration of the illustrated signal transmitting apparatus is the same as that of the signal transmitting apparatus in FIG. 1 except that a beam scanning unit 33 is provided and for the configurations of a weight determining unit 30a and a weight switching unit 31a. Thus, other constituents are denoted by the same reference signs as in FIG. 1, and the description thereof will be omitted.

The weight determining unit 30a determines a plurality of weights so that the non-communication direction becomes in each constant angle (e.g., 10 degrees, 20 degrees, 30 degrees and so on) with respect to the reference direction (e.g., 0 degrees) of the communication direction. Note that the required angle steps are system dependent. The beam scanning unit 33 selects a weight for an angular difference between the actual communication direction and the actual non-communication direction from among the plurality of weights determined by the weight determining unit 30a and further applies a steering vector, which corresponds to the angle of the difference with the actual communication direction, to the reference direction in the weight determining unit 30a. The weight switching unit 31 outputs the weight output from the beam scanning unit 33 as a weight in the communication direction or the non-communication direction. Other operation is the same as that of the first embodiment.

Since the beam scanning unit 33 is provided to apply the steering vector depending on the communication angle in the fifth embodiment, it is possible to select any directions as the communication direction and the non-communication direction while the number of weights (calculation amount) determined by the weight determining unit 30 is decreased.

As described above, according to the signal transmitting apparatus of the fifth embodiment, the weight switching unit outputs a weight so that a position of a signal point different from that of the signal point in the communication direction on the constellation diagram becomes a designated direction. Thus, it is possible to output a weight for the emission in any direction from the antenna.

Moreover, according to the signal transmitting apparatus of the fifth embodiment, the weight for the direction difference between the communication direction and the non-communication direction is selected from among the plurality of weights for the direction differences between the communication direction and the non-communication direction, the beam scanning unit is provided to apply the steering vector for the direction difference, and the weight switching unit outputs the weight from the beam scanning unit. Thus, it is possible to select any directions as the communication direction and the non-communication direction while the number of weights is decreased.

Note that, in the scope of the present invention, the present invention of this application allows free combinations of each embodiment, modification of any constituents of each embodiment, or omission of any constituents in each embodiment.

INDUSTRIAL APPLICABILITY

As described above, the signal transmitting apparatus according to the present invention relates to the configuration for holding the confidentiality in wireless communication by limiting the communication direction and is suitable to be used for a signal transmitting apparatus using an array antenna constituted by a plurality of element antennas.

REFERENCE SIGNS LIST

1: Input interface, 10: Modulation signal generating unit, 11: Low frequency unit. 12: Signal distributing unit, 13-1 to 13-N: High frequency unit, 14-1 to 14-N: Weight applying unit, 15-1 to 15-N: Variable phase shifter, 16-1 to 16-N: Variable amplifier, 17-1 to 17-N: Antenna, 20: Signal processing unit, 30, 30a: Weight determining unit, 31, 31a: Weight switching unit, 32: Weight controlling unit, 33: Beam scanning unit.

The invention claimed is:

1. A signal transmitting apparatus comprising:
an array antenna constituted by a plurality of element antennas;
a modulation signal generator to generate modulation signals emitted from the array antenna;
a weight switcher to select and output weights for the modulation signals so that, on a constellation diagram in a complex plane for the modulation signals emitted from the array antenna, a position of a signal point in a communication direction corresponds to a position of a modulation symbol generated by the modulation signal generator, and the signal point in a non-communication direction becomes the signal point corresponding to a different signal point among a plurality of the signal points that have equal amplitudes and phase angle differences with the adjacent signal points falling within a set range; and
a weight applier to apply, to the modulation signals emitted from the array antenna, weights for each modulation symbol output from the weight switcher.

2. The signal transmitting apparatus according to claim 1, wherein the weight switcher sets a weight as a weight in the non-communication direction so that the signal point on the constellation diagram is positioned within a set value range.

3. The signal transmitting apparatus according to claim 1, wherein the weight switcher randomly outputs, as a weight in the non-communication direction, any one weight from among a plurality of weights for signal points on the constellation diagram so that the signal points are at a plurality of different positions and have phase angle differences with adjacent signal points within a set range.

4. The signal transmitting apparatus according to claim 1, wherein the weight switcher selects a weight at a time interval that is a multiple of a modulation symbol generating interval of the modulation signal generator.

5. The signal transmitting apparatus according to claim 1, wherein the weight switcher outputs a weight so that a direction of the signal point different from that of the signal point in the communication direction on the constellation diagram becomes a designated direction.

6. The signal transmitting apparatus according to claim 1, further comprising
- a beam scanner to select a weight for a direction difference between the communication direction and the non-communication direction from among a plurality of weights for direction differences between the communication direction and the non-communication direction, and applying a steering vector corresponding to die direction difference, wherein the weight switcher outputs the weights from the beam scanner.

\* \* \* \* \*